United States Patent [19]

Thorndike et al.

[11] Patent Number: 5,017,080
[45] Date of Patent: *May 21, 1991

[54] HAND TRUCK

[75] Inventors: Charles E. Thorndike, Meredith; Vaino J. Holopainen, Moultonboro, both of N.H.

[73] Assignee: Blue Arrown Enterprises, Inc., Meredith, N.H.

[*] Notice: The portion of the term of this patent subsequent to Mar. 8, 2005 has been disclaimed.

[21] Appl. No.: 164,785

[22] Filed: Mar. 7, 1988

Related U.S. Application Data

[63] Continuation-in-part of Ser. No. 908,175, Sep. 16, 1986, Pat. No. 4,729,711.

[51] Int. Cl.⁵ .............................................. B65G 7/12
[52] U.S. Cl. .................................. 414/454; 294/104; 414/490; 414/608; 414/911
[58] Field of Search ............................. 414/453–457, 414/446, 490, 608, 618, 622, 704, 721, 908, 911; 294/11, 50.9, 104, 105

[56] References Cited

U.S. PATENT DOCUMENTS

| | | | |
|---|---|---|---|
| 1,142,088 | 6/1915 | Greene | 414/446 |
| 2,506,471 | 5/1950 | Siegal | 414/453 |
| 2,822,948 | 2/1958 | Carraway | 414/608 |
| 2,877,912 | 3/1959 | Giacomo | 414/454 X |
| 2,906,420 | 9/1959 | Garcia, Jr. | 414/456 X |
| 2,917,193 | 12/1959 | Fike | 414/446 |
| 3,255,905 | 6/1966 | Cochran | 414/446 |
| 3,318,473 | 5/1967 | Jones et al. | 414/608 |
| 3,790,011 | 2/1974 | Owen, Jr. | 414/608 X |
| 4,264,252 | 4/1981 | Jennings et al. | 294/105 X |
| 4,531,752 | 7/1985 | Diener | 414/446 X |
| 4,637,769 | 1/1987 | Thorndike | 294/104 X |
| 4,650,389 | 3/1987 | Mulqueen | 414/908 X |
| 4,662,669 | 5/1987 | Erickson et al. | 414/608 X |
| 4,729,711 | 3/1988 | Holopainen | 414/454 |

Primary Examiner—David A. Bucci
Attorney, Agent, or Firm—Nutter, McClennen & Fish

[57] ABSTRACT

A hand truck for lifting and transporting objects. The truck includes an elongated frame attached to a wheel assembly. A carriage is mounted on the frame to travel the length of the frame. The carriage includes a load bed that extends across the frame, and at least one protrusion located below the load bed that extends above the load bed. A seizing arm is pivotally attached to the carriage above the load body and has a seizing arm with a grip point directed toward the load body. The seizing arm has a stem that extends beyond the pivot point attachment opposite the seizing arm body. A winch with cable are attached to the top of the frame. The free end of the cable is attached to the seizing arm stem. Retracting the cable causes the seizing arm to pivot so the grip point is forced against as object located on the carriage. The force of the seizing arm is sufficient to secure the object between the grip point and the carriage. If the cable is retracted further, the carriage, with the object secured to it, is pulled up the frame to a desired elevation.

7 Claims, 6 Drawing Sheets

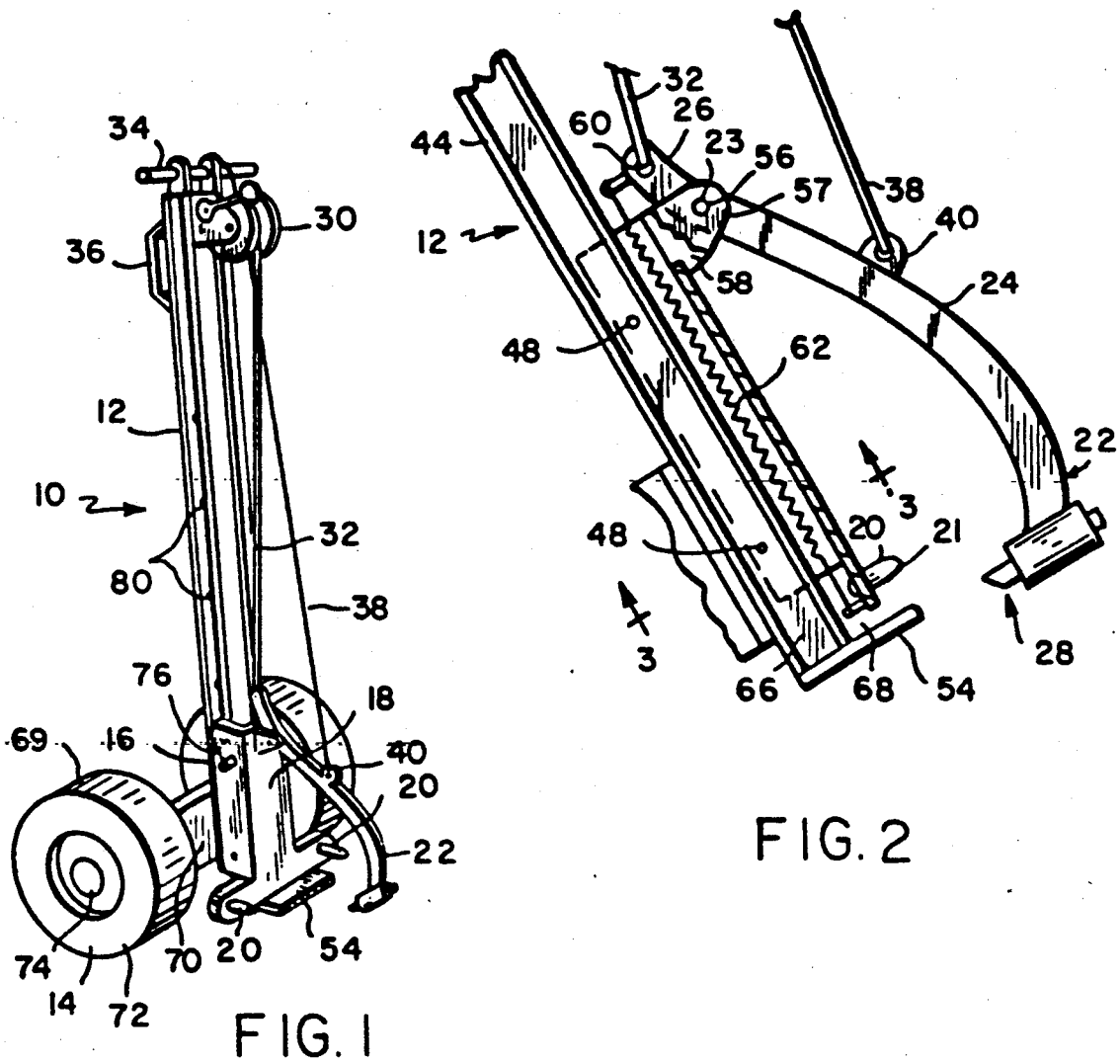
FIG. 1
FIG. 2
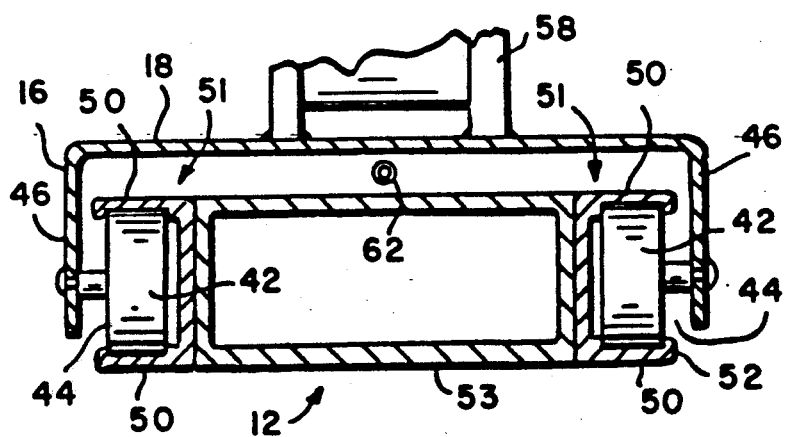
FIG. 3

HAND TRUCK

This application is a continuation-in-part application based on U.S. Pat. application Ser. No. 06/908,175 filed Sept. 16, 1986, now U.S. Pat. No. 4,729,711.

1. Field of the Invention

This invention relates to an improved apparatus for carrying loads, and in particular to a hand truck for lifting and transporting logs, stones, and other heavy objects.

BACKGROUND OF THE INVENTION

Hand trucks have been adapted in various ways to facilitate the carrying of loads. U.S. Pat. No. 4,637,769, to one of the co-inventors of this application, discloses a hand truck for carrying heavy objects. The hand truck includes a frame mounted on a wheel assembly. The lower portion of the frame serves as a bed on which objects can be supported. At the base of the frame is a heel, or a plurality of projections that extend out above the frame bed. A hook, hingedly secured to the frame above the frame bed, has a grip point that is oriented toward the frame bed. When an object is placed on the truck, gravity forces the hook downward so that the object is seized by the grip point and secured to the frame bed. Stabilizing wedges on the frame urge the object toward the grip point to insure that the object continually remains seized by the grip point. Thus, the object will remain secured to the hand truck while it is being transported thereon.

Current hand trucks, though useful, can transport objects only from one ground or floor location to another. They cannot be used to load or unload objects that are located a few feet off the ground. Thus, when it is necessary to transport an object to or from an elevated area, such as a work station, or a storage location, it is usually necessary to manually lower or raise the object to or from the ground. Often the objects to be transported are too heavy for one person to raise or lower. Also, some objects, such as large logs and stones, are without grasping points and are rather bulky, and thus are difficult to hold onto. This adds to the difficulty of lifting and lowering these objects.

Furthermore, with many hand trucks the strength of the seizing or grasping arm is gravity dependent. In some situations, such as transporting objects outdoors or over uneven terrain, the force exerted by the arm may be insufficient to securely hold the object to the hand truck in the face of the jarring motion encountered in moving over such terrain. The operator may have to use considerable care in transporting the objects, or the object may work itself free of the truck. If the object does come free of the hand truck, the operator must then resecure it to the truck. Moreover, in some situations, the terrain may be such that the seizing arm cannot secure the object in place on the truck even with great care by the operator. In such instances it may be impossible to use the hand truck and the objects have to be transported manually.

A need therefore exists for a new carrying apparatus for transporting heavy objects. The apparatus should be able to transport objects and be able to elevate them above or lower them to the ground. The new apparatus should also have a means to keep the objects firmly secured to the truck while being transported, regardless of the terrain the apparatus travels. In addition the apparatus should be relatively simple to operate and not require the operator to exert significant physical effort.

SUMMARY OF THE INVENTION

This invention comprises a hand truck that includes a normally upright frame that is attached to a wheel assembly. A carriage that includes a load bed is mounted to the frame by a set of wheels so that it can easily travel the entire length of the frame. A plurality of carriage pins located at the bottom of the carriage extend out above the load bed. A seizing arm, pivotally connected to the carriage above the load bed, has a grip point that is directed toward the frame. The grip point is positioned so that when adjacent to the frame it is directly beneath the carriage pins. The seizing arm also has a stem that extends above the pivot point. The stem is connected by a cable to a hand operated winch located at the top of the frame.

To use the hand truck, it is first positioned so the carriage load bed is adjacent to the object to be transported, the carriage pins are under the object, and the seizing arm is located above the object. The cable is then retracted by operation of the winch so as to rotate the arm about its pivot. This forces the grip point against the object on the load bed. The object is thus firmly held against either the carriage pins or the load bed by the seizing arm and will stay secured to the hand truck even while being transported over rough terrain.

It is also possible to raise and lower the object after it is secured to the hand truck. After the grip pin is in place against the object, further retraction of the cable will pull the carriage up the frame toward the winch. Since the object is secured to the carrier, it will rise along with the carrier. The object can thus be raised almost the full height of the hand truck for placement at a work station, storage location or any other elevated location. The hand truck may also be used in a similar manner to lower an object from an elevated location.

The seizing arm can be controlled by other mechanisms, such as a worm gear-type winch.

The seizing arm can be coupled to auxiliary load carrying devices, such as a tote box, which facilitate transportation of loose bulk material such as dirt or cement.

BRIEF DESCRIPTION OF THE DRAWINGS

FIG. 1 is a side view of the hand truck of this invention.

FIG. 2 is a cut away side of the carrier mounted to the frame of the hand truck of this invention.

FIG. 3 is a cross sectional view of the frame and carriage of the hand truck of this invention taken along line 3—3 of FIG. 2.

DETAILED DESCRIPTION OF AN ILLUSTRATIVE EMBODIMENT

Figure 4:
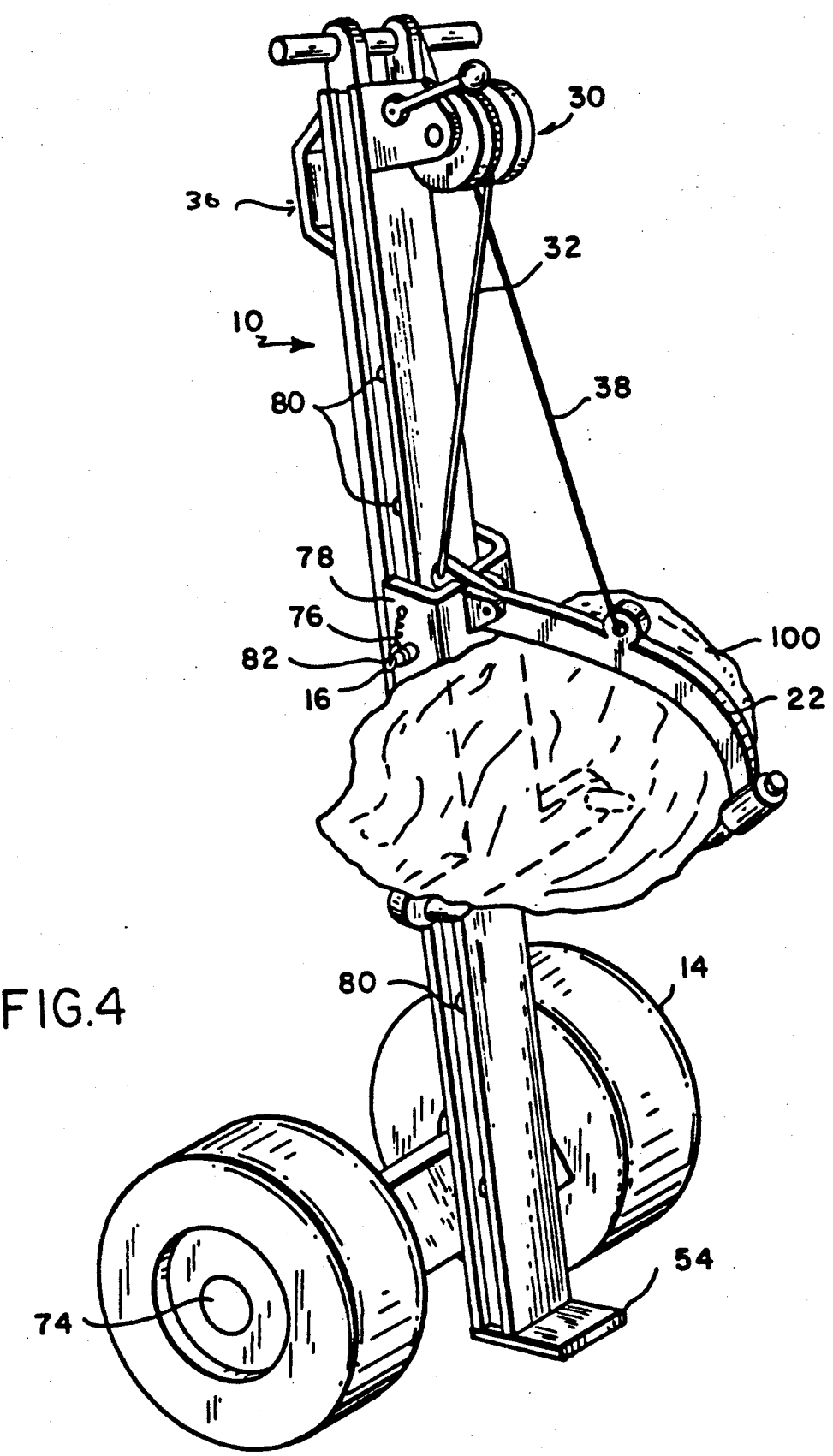
FIG. 4 is a side view of the hand truck of this invention positioned to transport and lift a stone.

As illustrated in FIG. 1 a hand truck 10 includes a frame 12 supported on a wheel assembly 14. A carriage 16 is mounted to the frame to travel the length of the frame. The carriage has a flat load bed 18 that extends across the frame, and a horizontal cross bar 19 located below the load bed that extends out from the sides of the carriage. At each end of the cross bar there is a carriage pin 20 that extends a short distance, e.g. 3 inches, from the surface of the load bed. Each of the carriage pins includes a beveled face 21 that ends in an edge at the outer end of the pin.

A seizing arm 22 is mounted to the carriage at a pivot 23 spaced from the load bed. The arm 22 comprises a curved body 24 that is directed away from the load bed, and stem 26, above the pivot 23, that extends upwardly and inwardly toward the frame 12. A grip pin 28, at the end of the body 24, projects toward the frame. The grip pin is positioned at the end of the arm body 24 so that when it is adjacent to the frame it is directly beneath the carriage pins 20. Thus, there is an overbite between the grip pin 28 and the carriage pins 20, best seen in FIG. 2. A hand operated ratchet winch 30 is attached to the top of the frame and is connected to the seizing arm stem 26 by a cable 32. The top of the frame is provided with a lateral handle 34 across the frame, and a U-shaped grip 36 affixed to the bottom of the frame. A tether line 38 extends between a eye 40 on the seizing arm and the frame handle.

As best seen in FIGS. 2 and 3 the carriage 16 is shown mounted to the frame 12 by two pairs of wheels 42, on opposite sides 46 of the carriage, that travel within tracks 44. The wheels are rotatively mounted to the carriage sides by inwardly extending axles 48. Each track is defined by a pair of parallel rails 50 that extend laterally outward from the frame. The rails are part of oppositely directed U-shaped beams 51 that are attached to a box member 53 that serves as the frame 12. Each rail is provided with a flange 52 that is directed over the outer radius of the wheels 42 so as to secure the wheels within the track. A stop plate 54 that extends horizontally from the base of the frame limits the downward movement of the carriage.

As shown in detail in FIG. 2 the seizing arm is rotatably attached to the carriage by a pivot pin 56 that extends through a mounting bore 57 located at the pivot 23. The pivot pin 56 is affixed to the top of a pivot frame 58 that is attached to the carriage above the load bed 18. The cable 32 is attached to the seizing arm stem 26 through a hole 60 located at the distal end of the stem away from the pivot point. A biasing spring 62 is attached at one end to the stem through the hole 60, extends under the load bed above the frame, and is attached at the opposite end to a carriage base plate 68 located at the base of the cross bar 19 by an eye bolt 66. When the cable 32 is slack the biasing spring exerts sufficient force on the seizing arm so the arm is rotated up away from the load bed.

Referring again to FIG. 1, the wheel assembly 14 includes a truck 69 having a cross member 70 that is attached to the lower end of the frame 12. A pair of wheels 72 are mounted for rotation to the carriage by an axle 74 that extends through side panels (not shown) on the truck. The wheels are spaced apart so they are outside of the carriage cross bar 19. Alternative wheel assemblies can be provided. For example a four wheel, two axle assembly can also be used. With such an assembly it may be desirable to have the frame 12 hingedly attached to the wheel assembly so the frame can be pivoted. Alternatively, a treaded assembly may be useful in transporting a load over soft or very uneven terrain.

As illustrated in FIG. 4 the hand truck may be used to transport and lift heavy and bulky objects such as a stone 100. The hand truck is positioned next to the object so the object is against the load bed 18. Since the carriage pins 20 have a relatively short length there is no need for the operator to expand a large amount of effort to force the pins under, or against, the object. The cable 32 is retracted by turning the winch 30. The cable pulls the seizing arm stem 26 away from the carriage so as to pivot the arm 22 about the pivot point 23. The seizing arm body 24 is rotated towards the load bed and the grip pin 28 is forced against the object. The cable is retracted until the grip pin exerts a sufficient force so that the object is gripped, or held between, the grip pin and either the load bed 18 or the carriage pins 20. If the object is gripped between the seizing arm and the load bed, the carriage pins provide vertical support to keep the object from falling off the load bed. The overbite between the carriage pins 20 and the grip pin 28 also insures that the object is securely held to the load bed 18. Once the object is so secured it may be transported to a desired location by the hand truck. With a single axle wheel assembly 14 or a hinged wheel assembly the frame 12 may be pivoted around the assembly. Grip 36 at the top of the frame serves as a base so the frame may be rested horizontally.

The object may be lifted once it is secured to the carriage. This is done by further retracting the cable 32 so the carriage 16 with the object secured to it, is pulled up along the frame 12. Once the carriage is at the desired height it maybe secured to the frame by a locking rod 76. The locking rod is inserted into a pair of vertically aligned rod openings 78 in the sides 46 of the carriage below the upper set of wheels 42, and into a pair of vertically aligned rod openings 80 in the frame between the rails 50. The frame is provided with a number of spaced apart pairs of rod openings 80 so the carriage can be secured to the frame at any position along the frame. The locking rod is attached to the carriage 16 by an eye-and-chain 82 attached to one of the sides 46.

After the object is transported to the desired location and height it may be released from the hand truck by slackening the cable 32 and pulling the tether line 38 so the seizing arm 22 is moved away from the object. This movement releases the force the grip pin exerted on the object, thus freeing the object from the carriage.

The hand truck can also be used to lower objects by first setting the empty carriage at a height so it is adjacent to the object to be transported. The object can then be secured to the carriage for both lowering and transport.

Figure 5:
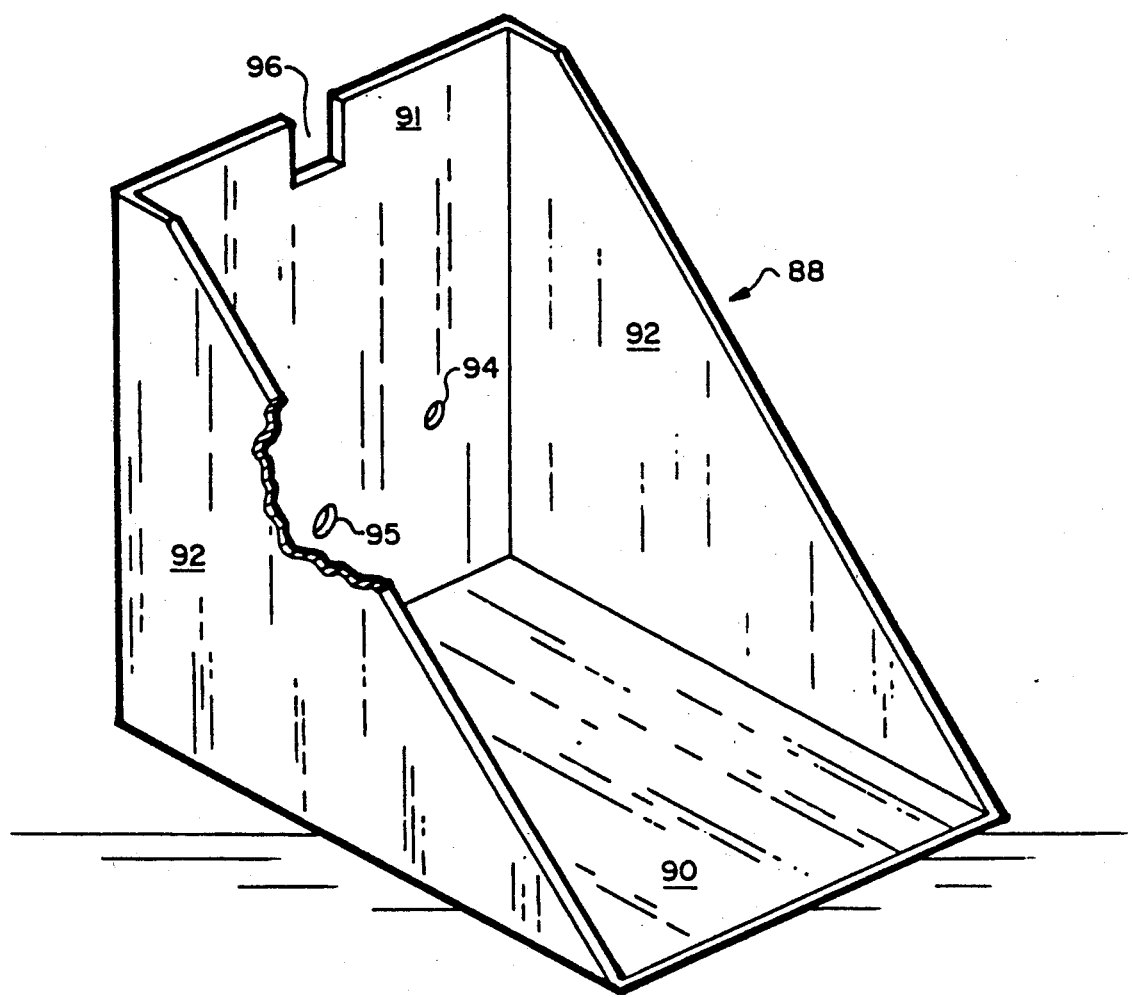
FIG. 5 is a perspective view of a detachable tote box that may be used with the hand truck of this invention.
Figure 6:
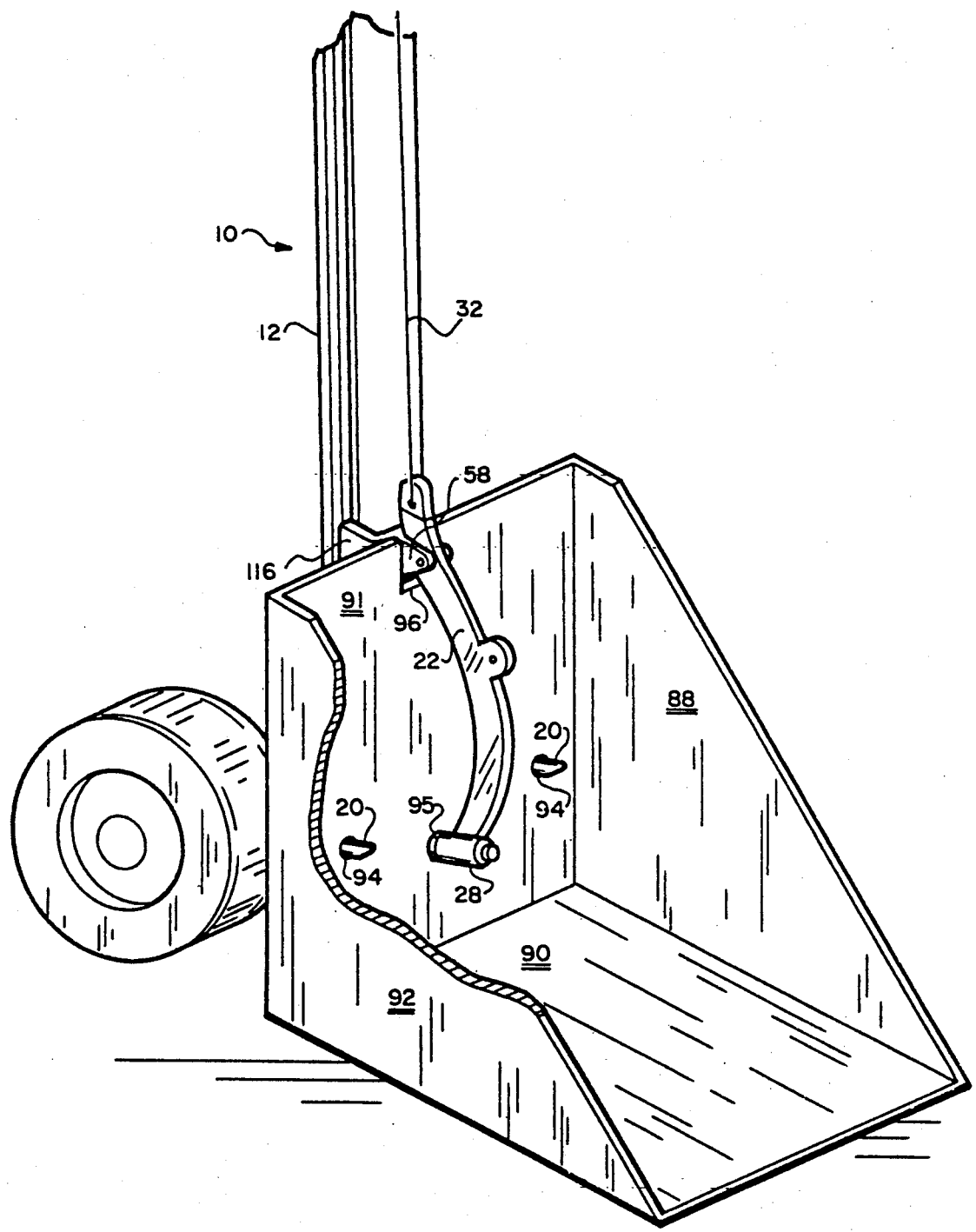
FIG. 6 is a cutaway partial perspective view illustrating how the tote box of FIG. 5 may be used with the hand truck of this invention.

A tote box 88 that can be temporarily coupled to the hand truck 10 is illustrated by FIGS. 5 and 6. The tote box 88 includes a horizontal bed 90, a back wall 91 that extends perpendicularly from the bed 90, and a pair of side walls 92 attached to the lateral edges of the bed 90 and back wall 91. Formed in the back wall 91 are two carriage pin openings 94, a seizing arm opening 95 and a pivot frame slot 96.

The tote box 88 is selectively coupled to the hand truck 10 by positioning the hand truck 10 against it so that the carriage pins 20 are inserted through the carriage pin openings 94, and the pivot frame 58 is within the pivot frame slot 96. The winch 30 is turned to retract the cable 32 which, in turn, causes the seizing arm grip pin 28 to pivot into the seizing arm opening 95 so that the tote box 88 is secured between the seizing arm 22 and the load bed 18. Further retraction of the cable 32 causes the carriage 16, with the tote box 88 secured thereto, to travel up the frame 12.

The tote box 88 provides a convenient container for carrying and lifting bulk material, such as dirt or cement, that may not otherwise be readily carried or lifted by the hand truck 10. Once the tote box 88 is positioned at a desired location it can be decoupled from the hand truck 10 and the hand truck then used to move additional tote boxes 88. This provides an economical method of moving and lifting large amounts of bulk materials since one hand truck 10 can be used to move and lift a number of tote boxes 88.

Figure 7:
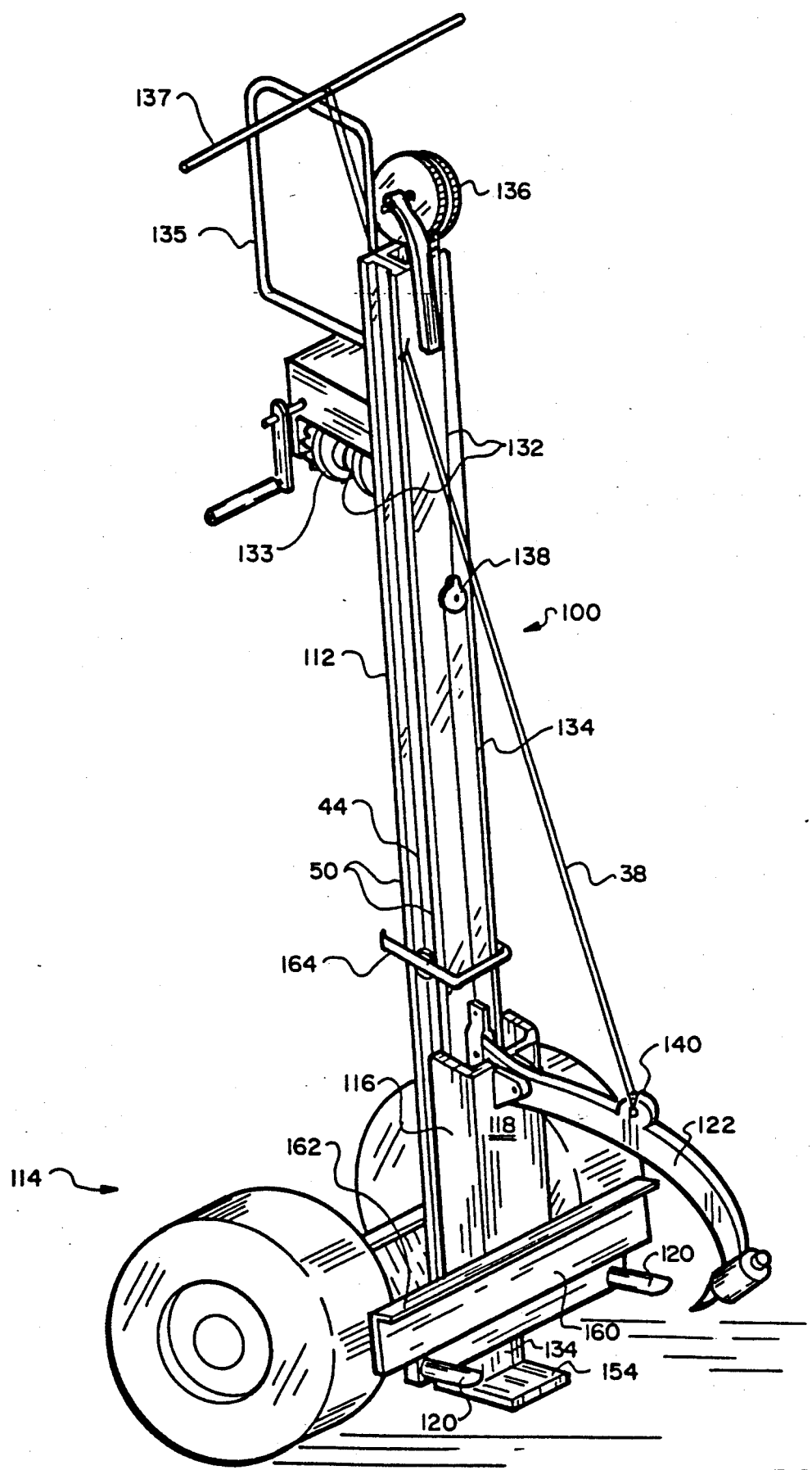
FIG. 7 is a view of an alternative embodiment of the hand truck of this invention incorporating a pulley mechanism to pivot the seizing arm and lift the carriage.
Figure 8:
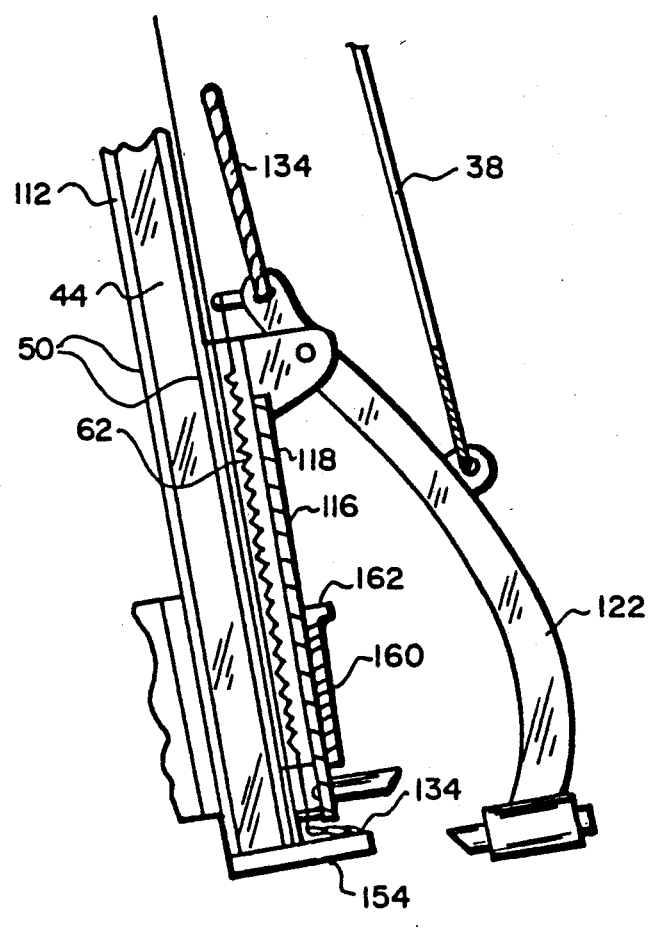
FIG. 8 is an exploded partial cross-sectional view illustrating the seizing arm of the embodiment of the invention illustrated in FIG. 7.

FIGS. 7 and 8 illustrate an alternative embodiment of the hand truck of this invention referred to generally by reference number 100. The hand truck 100 has a frame 112, a wheel assembly 114, a carriage 116 with load bed 118, and a pivotally mounted seizing arm 122 that are substantially identical to those described in the first embodiment of this invention. The carriage 116 travels along a set of tracks 44 defined by rails 50 integral with the frame 112 as in the first embodiment of the invention.

A worm gear type-winch 133 is used to pivot the seizing arm 122 and pull the carriage 116 up the frame 112. The winch 133 is connected to the seizing arm 122 by a winch cable 132 and a carriage cable 134. The winch cable 132 is directly attached to the winch 133 and is looped through a static pulley 136 mounted for free rotation to the top of the frame 112. A traveling pulley 138 is attached to the free end of the winch cable 132. The carriage cable 134 is anchored at one to a stop plate 154 that extends out from the base of the frame 112, passes between the frame 112 and the load bed 118 and is attached at the other end to a coupling piece 140 that is connected to the stem of the seizing arm 122. The carriage cable 134 is looped through the traveling pulley 138 so that as the winch cable 132 is pulled upward, it pulls the end of the carriage cable 134 connected to the seizing arm 132 in the same direction.

A cross beam 160 is attached to the base on the load bed 118 above a pair of carriage pins 120. The cross beam 160 has a lip 162 that extends out above the load bed 118. A traveling stop bar 164 is mounted in the tracks 44 above the carriage 116. A cam member 166 attached to each side of the stop bar 164 and within the tracks 144 locks the stop bar in place when the carriage 116 exerts a force on it. An oversized grip 135 is attached to the frame 112 above the winch and is dimensioned so that when the frame 112 is rested on the grip 135, the frame will not be angled below the horizontal. An over-sized pulling bar 137 is attached to the grip.

Objects are held, lifted and lowered by the hand truck 110 by turning the winch 133 so the winch cable 132 is retracted. The retraction of the winch cable pulls causes the end of the carriage cable 134 attached to the seizing arm 122 to turn so that the seizing arm 122 is pivoted towards the carriage 116, and the object adjacent the load bed 118 is held in place by the seizing arm 122. Further retraction the winch cable 132 cause the carriage cable 134 to pull the carriage upwards along the frame 112. The winch cable 132 may be extended to lower the carriage 116 and the object attached thereto.

The worm gear-type winch 133 allows the carriage 116 to be accurately positioned at location along the frame 112. The static pulley 136, the winch cable 132, the carriage cable 134, and the traveling pulley 138 arrangement enable the hand truck 100 to secure and lift extremely heavy loads with a minimal amount of difficulty. The stop bar 164 prevents users of the hand truck from unintentionally lifting the carriage 116 beyond a selected height. Moreover, when the frame 116 is rested on the grip 135, the stop bar can be set to prevent the carriage from unintentionally rolling along the frame. The cross beam lip 162 is provides a strengthened gripping point for objects secured between the load bed 118 and the seizing arm 122.

It will be apparent from the foregoing description that alternative embodiments of the hand truck of this invention may be offered without departing from the scope of the invention. For example, the carriage pins 20 may be replaced with a rake frame or another type of attachment provided to extend from the surface of the load bed 18. These attachments may be desirable if the hand truck is to be used to transport construction material, extremely large stones, or other objects requiring special support. For some purposes it may be desirable to provide the load bed with an uneven surface, or a number of projections, to have a maximum gripping effect between the load bed and the grip pin or the seizing arm. In some embodiments of the invention it may be desirable to provide a tote box permanently attached to the carriage in order to carry some loads. Alternatively, it may be desirable to provide a tote box with a bottom that opens so that it can readily be emptied of its contents. Different accessories, besides the specific tote box 88 may be provided that can readily be selectively coupled to the hand truck 100. The other accessories would have a coupling plate similar to the back wall 91 of the tote box 88 so that the accessory could be readily coupled to the hand truck 10 and lifted thereby. Other single actuator means, including small motor-driven winches, can be provided to pivot the seizing arm and pull the carriage upward.

Therefore, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A hand truck, for transporting and lifting a load, comprising:
   a. an elongated frame having an upper and lower end;
   b. a wheel assembly attached to the lower end of the frame;
   c. a carriage mounted on the frame and adapted to freely travel the length of the frame, the carriage having a load bed that extends across the frame, and at least one protrusion below the load bed that extends across the frame;
   d. a seizing arm pivotably attached at a pivot point to the carriage above the load bed, the seizing arm having a body, the body having a securing means directed toward said load surface, and the seizing arm also having a stem directed away from the pivot point; and
   e. single actuator means for forcing the seizing arm towards the load bed so that an object placed on the load bed is secured between the seizing arm and the carriage, and then for positioning the carriage along the frame, the actuator means including:
  i. a cable and winch attached to the upper end of the frame, a free end of the cable attached to a travelling pulley; and
  ii. a carriage cable attached at one end to a stop plate fixed to the frame below the carriage, extending through the traveling pulley, and attached at a second end to the seizing arm stem.

2. A hand truck as in claim 1, additionally comprising:
  c. a tote box, having a back wall selectively couplable to the carriage.

3. The hand truck of claim 2 wherein the back wall of the tote box additionally includes a first opening adapted to receive the load bed protrusion therethrough, and a second opening adapted to receive the seizing arm therethrough.

4. A hand truck, for transporting and lifting a load, comprising:
  a. an elongated frame having an upper and lower end;
  b. a wheel assembly attached to the lower end of the frame;
  c. a carriage mounted on the frame and adapted to freely travel the length of the frame, the carriage having a load bed that extends across the frame, and at least one protrusion below the load bed that extends across the frame;
  d. a seizing arm pivotably attached at a pivot point to the carriage above the load bed, the seizing arm having a body, the body having a securing means directed toward said load surface; and
  e. a single actuator means for forcing the seizing arm towards the load bed so that an object placed on the load bed is secured between the seizing arm and the carriage, and then for positioning the carriage along the frames;
  f. a tote box, having a back wall selectively couplable to the carriage adjacent the load bed.

5. A hand truck as in claim 4 wherein the tote box comprises:
  a. a bed;
  b. a back wall that extends perpendicularly from the bed, with a first opening adapted to receive the protrusion of the carriage, and a second opening for receiving the seizing arm.

6. For use with a hand truck, the hand truck including a movable carriage adapted to freely travel along the length of the hand truck frame, the carriage having a static protrusion and a movable seizing arm, the tote box comprising:
  a. a bed;
  b. a back wall that extends perpendicularly from the bed, with a first opening adapted to receive the static protrusion of the movable carriage, and a second opening adapted to receive the movable seizing arm.

7. For use with a hand truck, a coupling plate for selectively coupling an accessory apparatus to the hand truck at a movable carriage adapted to freely travel along the length of the hand truck frame, the carriage having a static protrusion and a movable seizing arm, the coupling plate comprising a generally vertically extending wall, the wall with a first opening adapted to receive the static protrusion of the movable carriage, and a second opening adapted to receive the movable seizing arm.

* * * * *